United States Patent [19]

Kubota et al.

[11] Patent Number: 5,200,494
[45] Date of Patent: Apr. 6, 1993

[54] ONE-PACK TYPE EPOXIDE COMPOSITION

[75] Inventors: Masao Kubota; Ritaro Nagabuchi; Yasuo Chiba, all of Miyoshi, Japan

[73] Assignee: Fuji Kasei Kogyo Co., Ltd., Tokyo, Japan

[21] Appl. No.: 683,047

[22] Filed: Apr. 10, 1991

[30] Foreign Application Priority Data

Apr. 16, 1990 [JP] Japan .................. 2-97781

[51] Int. Cl.$^5$ .................. C08L 63/00; C08G 59/50; C08G 51/04

[52] U.S. Cl. .................. 528/111; 528/120; 525/526; 544/382; 544/383; 560/25; 560/115

[58] Field of Search ............... 528/111, 120; 525/526; 544/382, 383; 560/25, 115

[56] References Cited

U.S. PATENT DOCUMENTS 4,036,795 7/1977 Tominaga ..................... 528/45
4,480,082 10/1984 McLean et al. ................. 528/111

FOREIGN PATENT DOCUMENTS 51-14999 2/1976 Japan .
61-155420 7/1986 Japan .
62-146915 6/1987 Japan .

Primary Examiner—John Kight, III
Assistant Examiner—Richard Jones
Attorney, Agent, or Firm—Fred Philpitt

[57] ABSTRACT

A one-pack type epoxide composition which has excellent storage stability and which can be rapidly cured at relatively low temperature is provided. It comprises as effective components (A) at least one epoxide having more than one, preferably more than 1.5 epoxy groups per a molecule, and (B) a curing agent prepared by heating and reacting (a) at least one N,N-dialkylaminoalkylamine, (b) at least one amine having one or two nitrogen atoms with active hydrogen and having a ring structure in its molecule, (c) at least one diisocyanate, or (C) a curing agent prepared by heating and reacting (a) at least one N,N-dialkylaminoalkylamine, (b) at least one amine having one or two nitrogen atoms with active hydrogen and having a ring structure in its molecule, (d) at least one epoxide having one or more epoxy groups in a molecule, and (c) at least on diisocyanate.

10 Claims, No Drawings

ONE-PACK TYPE EPOXIDE COMPOSITION

BACKGROUND OF THE INVENTION

1. Field of the Invention

The present invention relates to a one-pack type epoxide composition.

Epoxides having more than one epoxy groups in their molecule, when combined and mixed with various curing agents, may be cured at ambient temperature or elevated temperature. Since the cured epoxides have excellent adhesion to various materials, they have been used in variety of fields of application such as adhesives and coatings, and in injection, dipping, casting and potting. The present invention is to provide, in the fields relating to epoxides, epoxide compositions which can be easily handled and have excellent curing characteristics. More concretely, the present invention is to provide one-pack type heat curing epoxide compositions which have excellent storage stability and can be cured in a short period of time at relatively low temperature.

2. Description of the Prior Art

Most of the conventionally used epoxide compositions are of two-pack type, and they have to be used immediately after mixing an epoxide and a curing agent or a curing accelerator. Although two-pack type epoxide compositions may be cured at room temperature or at low temperature, they have to be precisely weighed and mixed just prior to use. When wrong amounts are weighed relative to the correct amounts of the epoxide and the curing agent, or subsequent mixing is not sufficient even if correct amounts are weighed, there is a problem that the performance of the cured material is insufficient. Also, limited pot life of conventional two-pack type epoxide compositions makes their adaptability to automated machines difficult. Thus, it is desired to produce one-pack type heat curing epoxide compositions to eliminate these drawbacks.

One-pack type heat curing epoxide compositions need a latent-type curing agent which has a property of not reacting with an epoxide at room temperature but starting reaction to cure upon heating. Some latent-type curing agents have been proposed so far, and typically, there may be mentioned dicyandiamide, dibasic acid dihydrazides, boron trifluoride amine complex salts, guanamines, melamine and imidazoles. Although, mixtures of dicyandiamide, melamine or a guanamine with an epoxide are excellent in storage stability, they have a drawback of necessitating a curing condition at high temperature above 150° C. for a long period of time. Although, it has been widely done to shorten the curing time by the use of a curing accelerator, this accompanies a drawback that storage stability is extremely damaged. Also, dibasic acid dihydrazides and imidazoles have poor storage stability even though they cure the epoxide at relatively low temperature. Boron trifluoride amine complex salts have advantages of excellent storage stability and short curing time. But the cured materials have poor resistance to water and cause corrosion of metals. Thus, each of curing agents has a drawback. Under such circumstances, it has been desired to develop an epoxide composition which has excellent storage stability, can be cured at low temperature in a short period of time, and yet exhibits good performance when cured.

To eliminate the drawback, it has been proposed to use as a curing agent for polyepoxides a reaction product between a dialkylamine and an epoxide in Japanese Unexamined Patent Publications Sho 56-155222 and Sho 57-100127 and a reaction product between an alcohol or phenol having a tertiary amino group and a polyepoxide in Sho 59-53526. However, these synthesized curing agents actually did not have good storage stability, and the performance of the cured material was not satisfactory.

Japanese Unexamined Patent Publication Hei 1-254731 discloses that a curing agent prepared by heating and reacting N,N-dialkylaminoalkylamine, an amine having two amino groups and urea is effective as a latent type curing agent. The synthesis of this curing agent is based on a reaction wherein ammonia is removed from the amino-containing substance and urea. Thus, a large amount is lost as ammonia during this reaction and this process is economically disadvantageous because the yield of the objective material is low. It is desired to solve this problem and there is need to develop a synthesis method in which there is no volatile component during the reaction Thus, it is an object of the present invention to provide a latent type curing agent which is economically advantageous and which, when mixed with an epoxide, provides an epoxide composition that can be cured in a short period of time at relatively low temperature, i.e. from 80° to 120° C. while maintaining good storage stability

SUMMARY OF THE INVENTION

The present invention relates to one-pack type heat curing epoxide compositions which comprise as effective components (A) at least one epoxide having more than one, preferably more than 1.5 epoxy groups per a molecule, and (B) a curing agent prepared by heating and reacting (a) at least one N,N-dialkylaminoalkylamine represented by the general formula

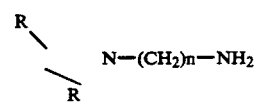

wherein R is alkyl group of 1 to 4 carbon atoms, and n is an integer of 2 or 3

(b) at least one amine having one or two nitrogen atoms with active hydrogen and having a ring structure in its molecule, (c) at least one diisocyanate, or (C) a curing agent prepared by heating and reacting (a) at least one N,N-dialkylaminoalkylamine represented by the general formula

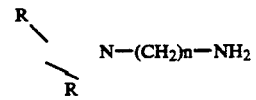

wherein R is alkyl group of 1 to 4 carbon atoms, and n is an integer of 2 or 3, (b) at least one amine having one or two nitrogen atoms with active hydrogen and having a ring structure in its molecule, (d) at least one epoxide having one or more epoxy groups in a molecule, and (c) at least one diisocyanate.

More particularly, it relates to one-pack type heat curing epoxide compositions which have excellent storage stability and can be rapidly cured at relatively low temperature.

DETAILED DESCRIPTION OF THE INVENTION

The epoxide which is one of the essential components of the present invention has more than one, preferably more than 1.5 epoxy groups per a molecule and includes, for example, glycidyl ethers obtained by reacting epichlorohydrin with a polyhydric phenol such as bisphenol A, bisphenol F, bisphenol S, hexahydrobisphenol A, tetramethylbisphenol A, catechol, resorcinol, cresol, novolak, tetrabromobisphenol A, trihydroxybiphenyl, benzophenone, bis-resorcinol, bisphenol hexafluoroacetone, hydroquinone, tetramethylbisphenol A, tetramethylbisphenol F, triphenylmethane, tetraphenylethane and bixylenol; polyglycidyl ethers obtained by reacting epichlorohydrin with an aliphatic polyhydric alcohol such as glycerin, neopentyl glycol, ethylene glycol, propylene glycol, butylene glycol, hexylene glycol, polyethylene glycol, polypropylene glycol; glycidyl ether esters obtained by reacting epi7 chlorohydrin with a hydroxycarboxylic acid such as p-hydroxybenzoic acid, beta-hydroxynaphthalene carboxylic acid; polyglycidyl esters obtained from a polycarboxylic acid such as phthalic, methylphthalic, isophthalic, telephthalic, tetrahydrophthalic, hexahydrophthalic, endomethylenetetrahydrophthalic, endomethylenehexahydrophthalic, trimellitic and polymerized fatty acid; glycidylaminoglycidyl ethers obtained from aminophenol or aminoalkylphenol; glycidylaminoglyci7 dyl ester obtained from aminobenzoic acid; glycidylamines obtained from aniline, toluidine, tribromoaniline, xylylenediamine, diaminocyclohexane, bisaminomethylcyclohexane, 4,4'-diaminodiphenylmethane, 4,4'-diaminodiphenyl sulfone or the like; and mono-epoxy compounds exemplified by epoxypolyolefin, glycidylhydantoin, glycidylalkylhydantoin, triglycidyl cyanulate, butylglycidyl ether, phenylglycidyl ether, alkylphenylglycidyl ether, glycidyl ester of benzoic acid, stylene oxide and the like; as well as mixtures of one or more of these compounds.

The other essential component of the present invention, the curing agent may be obtained by reacting (a) at least one N,N-dialkylaminoalkylamine, (b) at least one amine having one or two nitrogen atoms with active hydrogen and having a ring structure in its molecule, and (c) at least one diisocyanate, or (a) at least one N,N-dialkylaminoalkylamine, (b) at least one amine having one or two nitrogen atoms with active hydrogen and having a ring structure in its molecule, (d) at least one epoxide having one or more epoxy groups in a molecule, and (c) at least one diisocyanate.

The N,N-dialkylaminoalkylamine used herein is represented by the general formula

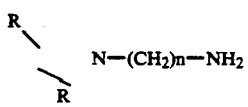

wherein R is alkyl of 1 to 4 carbon atoms and n is 2 or 3.

As examples of this amine, there may be mentioned dimethylaminopropylamine, diethylaminopropylamine, dipropylaminopropylamine, dibutylaminopropylamine, dimethylaminoethylamine, diethylaminoethylamine, dipropylaminoethylamine, dibutylaminoethylamine, and the like. Among others, dimethylaminopropylamine and diethylaminopropylamine are preferred, As the amine having one or two nitrogen atoms with active hydrogen and having a ring structure in its molecule, there may be mentioned polyamines and monoamines such as metaxylylenediamine, 1,3-bis-(aminomethyl)cyclohexane, isophoronediamine, diaminocyclohexane, phenylenediamine, tolylenediamine, diami7 nodiphenylmethane, diaminodiphenyl sulfone, piperadine, N-aminoethylpiperadine, benzylamine, cyclohexylamine, and the like. Of these amines, metaxylylenediamine, 1,3-bis(aminomethyl)cyclohexane, isophoronediamine, N-aminoethylpiperadine, cyclohexylamine and benzylamine are particularly preferred. Of these amine components, the polyamines act as a molecular chain extender and the monoamines act as a molecular weight regulator for a curing agent molecule.

As the diisocyanate, there may be mentioned isophorone diisocyanate, methaxylylene diisocyanate, 1,3-bis-(isocyanatomethyl)cyclohexane, 2,4-tolylene diisocyanate, 2,6-tolylene diisocyanate, 1,5-naphthylene diisocyanate, 1,4-phenylene diisocyanate, diphenylmethane-4,4'-diisocyanate, 2,2'-dimethyldiphenylmethane-4,4'-diisocyanate, hexamethylene diisocyanate, trimethylhexamethylene diisocyanate, and the like, of which diisocyanates having a ring structure are particularly preferred.

As the epoxide in the raw material components of the curing agent which is a component of the present invention, the above-mentioned epoxides, namely, one of the essential components of the present invention may be used. Of these epoxides, bisphenol A type epoxide having an epoxy equivalent weight of about 190, bisphenol F type epoxide having an epoxy equivalent weight of about 175, glycidylaniline, and glycidylorthotoluidine, as well as monoepoxides such as phenylglycidylether, methylphenylglycidylether and butylphenylglycidylethe are particularly preferred. Of these epoxides, diepoxides act as a molecular chain extending material and monoepoxides act as a molecular weight adjusting material for a curing agent molecule.

The curing agent of the present invention is synthesized basically as follows. N,N-dialkylaminoalkylamine (a), amine (b) having one or two nitrogen atoms with active hydrogen and having a ring structure in its molecule, and diisocyanate (c) are heated and reacted in a solvent such as aromatic hydrocarbons, alcohols and ketones etc. at temperature from room temperature to 160° C., preferably from 50° C. to 130° C. and then the solvent is removed. Or, addition reaction is carried out between a part or the all of (b) and epoxide (d) having one or more epoxy groups in a molecule with or without one of the above-mentioned solvents at 60° C. to 120° C., and (a), the rest of (b) and (c) are added to them, the reactants are heated and reacted at room temperature to 160° C., preferably 50° C. to 150°C.,and then the solvent is removed. It is also possible to use diisocyanate (c) preliminarily blocked with oxime, alcohol or the like.

In the case of curing agent (B) prepared by reacting at least one N,N-dialkylaminoalkylamine(a), at least one amine(b) having one or two nitrogen atoms with active hydrogen and having a ring structure in its molecule, and at least one diisocyanate(c), the molar ratio of (b) to a mole of (a) is 0.02 mole ≤ (b) ≤ 3.0 moles, and when the amount of (b) is smaller than 0.02 mole, the product has a low melting point and poor storage stability, whereas when the amount of (b) is greater than 3.0 moles, the product has poor curing property at low temperature. The ratio of (c) is such that the chemical equivalent of diisocyanate in (c) per one nitrogen atoms with active hydrogen in (a) and (b) is in the range of 1 chemical equivalent ≤ diisocyanate ≤ 1.2 chemical equivalents. When the chemical equivalent of diisocyanate in the used amount is smaller than 1 chemical equivalent, the product is tacky solid which can hardly be crushed and the epoxide composition has poor storage stability. Also, when the chemical equivalent of diisocyanate in the used amount is greater than 1.2 chemical equivalents, the product has a high melting point and poor low temperature curing properties.

In the case of curing agent (C) prepared by reacting (a) at least one N,N-dialkylaminoalkylamine, (b) at least one amine having one or two nitrogen atoms with active hydrogen and having a ring structure in its molecule, (c) at least one diisocyanate, and (d) at least one epoxide having one or more epoxy groups in a molecule, the molar ratio of (b) to a mole of (a) is 0.5 mole ≤ (b) ≤ 5.0 moles. When used amount of (b) is smaller than 0.5 mole, the product has a low melting point and poor storage stability. When the amount of (b) is greater than 5.0 moles, the product has poor curing property at low temperature. The ratio of (c) is such that the chemi7 cal equivalent of diisocyanate in (c) per one nitrogen atom with active hydrogen in (a) and (b) is in the range of 0.15 chemical equivalent ≤ diisocyanate ≤ 1.35 chemi7 cal equivalents. When the amount of (c) in which the chemical equivalent of diisocyanate is smaller than 0.15 chemical equivalent is used, the product is a tacky solid which can hardly be crushed and the epoxide composi7 tion has poor storage stability. When the amount of (c) in which the chemical equivalent of diisocyanate is greater than 1.35 chemical equivalents is used, the product has a high melting point and poor low temperature curing properties. The ratio of (d) is such that the chemical equivalent of epoxide in (d) per one nitrogen atom with active hydrogen in (a) and (b) is in the range of 0.3 chemical equivalent ≤ epoxide ≤ 0.9 chemical equivalent. When the chemical equivalent of epoxide is smaller than 0.3 chemical equivalent or greater than 0.9 chemi7 cal equivalent, both low temperature curing properties and storage stability of the product are poor. Also, the sum of the chemical equivalent of diisocyanate in (c) and the chemical equivalent of epoxide in (d) per one nitrogen atom with active hydrogen in (a) and (b) is in the range of 1.0 chemical equivalent ≤ sum of chemical equivalent of diisocyanate and epoxide ≤ 1.8 chemical equivalents. When the sum is smaller than 1.0 chemical equivalent, the product has tackiness and poor storage stability, and when the sum is greater than 1.8 chemical equivalents, molecular weight of the product is increased and gelation occurs.

The composition of the present invention can be obtained by mixing and dispersing powder of the curing agent with the epoxide. When the epoxide is a liquid, it is preferred to blend a curing agent therewith in predetermined ratio and further mix and disperse it suffi7 ciently by using a device like a mortar. When the epoxide is a solid, it is preferred to use preliminarily finely crushed epoxide and mix it sufficiently with a curing agent.

The blending amount of the curing agent to the epoxide differs depending on the type of the epoxide, particularly the concentration of the epoxy groups in the epoxide, and is within the range of 1 to 40 parts relative to 100 parts of the epoxide.

It is also possible to use concurrently various conventional curing agents known to be a latent-type curing agent such as acid anhydrides, dicyandiamide, melamine, guanamines, dibasic acid hydrazides, imidazoles, and the like. Also, other additives may optionally be added as necessary to the one-pack type heat curing epoxide composition of the present invention. As such additives, there may be mentioned inorganic powdery materials such as alumina, silica, silica powder, talc, bentonite, calcium carbonate, and cement; asbestos, glass fibers, synthetic fibers, mica, metal powder, as well as thixotropic agent or similar materials. Also, if necessary, other diluent and flame retardants may be added.

EXAMPLES

Followings are examples of the present invention. The present invention is not limited to the range of the working examples.

Curing Agent Preparation 1

In a four necked flask equipped with a thermometer, a reflux condenser, a stirrer, a nitrogen inlet device and a dropping funnel, were charged 71.0 g (0.5 mole) of 1,3-bis(aminomethyl)cyclohexane, 102.0 g (1.0 mole) of dimethylaminopropylamine, and 115.0 g of toluene. While blowing nitrogen into them, they were heated to 100° C. While maintaining the temperature and vigorously mixing them, was added dropwise from the dropping funnel a mixture of 194.0 g (1.0 mole) of 1,3-bis-(isocyanatomethyl)cyclohexane and 129.3 g of toluene. After addition was complete, reaction was carried out until free isocyanate is confirmed to be absent. Thereafter, toluene was removed in vacuo. The obtained product is a transparent pale yellow solid which can be readily crushed. This obtained curing agent is designated as A.

Curing Agent Preparation 2

In a four necked flask equipped with a thermometer, a reflux condenser, a stirrer, a nitrogen inlet device and a dropping funnel, were charged 21.25 g (0.125 mole) of isophoronediamine, 102.0 g (1.0 mole) of dimethylaminopropylamine, and 82.2 g of isopropanol. While blowing nitrogen into them, they were heated to 80° C. While maintaining the temperature and vigorously mixing them, was added dropwise from the dropping funnel 138.75 g (0.625 mole) of isophorone diisocyanate. After addition was complete, reaction was carried out until free isocyanate is confirmed to be absent. Thereafter, isopropanol was removed in vacuo. The obtained product is a transparent pale yellow solid which can be readily crushed. This obtained curing agent is designated as B.

Curing Agent Preparation 3

In a four necked flask equipped with a thermometer, a reflux condenser, a stirrer, a nitrogen inlet device and a dropping funnel, were charged 68.0 g (0.5 mole) of methaxylylenediamine, 153.0 g (1.5 moles) of dimethylaminoprolylamine, 53.5 g (0.5 mole) of benzylamine and 183.0 g of xylene. While blowing nitrogen into them, they were heated to 110° C. While maintaining the temperature and vigorously mixing them, was added dropwise from the dropping funnel a mixture of 222.0 g (1.0 mole) of isophorone diisocyanate, 94.0 g (0.5 mole) of xylylene diisocyanate, and 210.7 g of xylene. After addition was complete, reaction was carried out until free isocyanate is confirmed to be absent. Thereafter, xylene was removed in vacuo. The obtained product is a transparent pale yellow solid which can be readily crushed. This obtained curing agent is designated as C.

Curing Agent Preparation 4

In a four necked flask equipped with a thermometer, a reflux condenser, a stirrer, a nitrogen inlet device and a dropping funnel, was charged 138.75 g (0.625 mole) of isophorone diisocyanate. While blowing nitrogen into it, it was heated to 80° C. While maintaining the temperature and mixing it, was added dropwise from the dropping funnel 108.75 g (1.25 moles) of methyl ethyl ketoxime. After addition was complete, reaction was carried out at 80° C. until free isocyanate is confirmed to be absent. Then were added 21.25 g (0.125 mole) of isophoronediamine and 102.0 g (1.0 mole) of dimethylamino-propylamine, and the reaction was carried out at 130° C. until absorption at 1731cm$^{-1}$ by IR spectrum disappears. Thereafter, methyl ethyl ketoxime was removed in vacuo. The obtained product is a transparent pale yellow solid which can be readily crushed. This obtained curing agent is designated as D.

Curing Agent Preparation 5

In a four necked flask equipped with a thermometer, a reflux condenser, a stirrer, a nitrogen inlet device and a dropping funnel, were charged 39,3 g (0.231 mole) of isophoronediamine, 10.9 g (0.11 mole) of cyclohexylamine, and 98.7 g of xylene. While blowing nitrogen into them, they were heated to 120° C. While maintaining the temperature and mixing them, was added dropwise from the dropping funnel 59.4 g (0.44 equivalent) of GOT (diglycidylorthotoluidine, Nippon Kayaku K.K., epoxy equivalent weight about 135). After addition was complete, they were kept standing at 120° C. for two hours to complete the reaction. Then, was added 33.7 g (0.33 mole) of dimethylaminopropylamine, and they were heated to 130° C. While maintaining this temperature and vigorously mixing them, was added dropwise from the dropping funnel a mixture of 40.2 g (0.231 mole) of toluene diisocyanate and 20.1 g of xylene. After addition was complete, reaction was carried out while refluxing xylene until free isocyanate is confirmed to be absent. Thereafter, xylene was removed in vacuo. The obtained product is a transparent pale yellow solid which can be readily crushed. This obtained curing agent is designated as E.

Curing Agent Preparation 6

In a four necked flask equipped with a thermometer, a reflux condenser, a stirrer, a nitrogen inlet device and a dropping funnel were charged 30.0 g (0.221 mole) of methaxylylenediamine, 10.4g (0.105 mole) of cyclohexylamine, and 97.1 g of xylene. While blowing nitrogen into them, they were heated to 120° C. While maintaining the temperature and mixing them, was added dropwise from the dropping funnel 56.7 g (0.42 equivalent) of GOT. After addition was complete, it was kept standing at 120° C. for two hours to complete the reaction. Then, was added 32.1 g (0.315 mole) of dimethylaminopropylamine and they were heated to 130° C. While maintaining this temperature and vigorously stirring them, was added dropwise from the dropping funnel a mixture of 49.0 g (0.221 mole) of isophorone diisocyanate and 24.5 g of xylene. After addition was complete, reaction was carried out while refluxing xylene until free isocyanate is confirmed to be absent. Thereafter, xylene was removed in vacuo. The obtained product is a transparent yellow solid which can be readily crushed. This obtained curing agent is designated as F.

Curing Agent Preparation 7

In a four necked flask equipped with a thermometer, a reflux condenser, a stirrer, a nitrogen inlet device and a dropping funnel, were charged 28.4 g (0.22 mole) of N-aminoethylpiperadine, 10.4 g (0.105 mole) of cyclohexylamine, and 95.5 g of xylene. While blowing nitrogen into them, they were heated to 120° C. While maintaining the temperature and mixing them, was added dropwise from the dropping funnel 56.7 g (0.42 equivalent) of GOT. After addition was complete, they were kept standing at 120° C. for two hours to complete the reaction. Then, was added 32.1 g (0.315 mole) of dimethylaminopropylamine and they were heated to 130° C. While maintaining this temperature and vigorously stirring them, was added dropwise from a dropping funnel a mixture of 49.0 g (0.221 mole) of isophorone diisocyanate and 24.5 g of xylene. After addition was complete, reaction was carried out while refluxing xylene until free isocyanate is confirmed to be absent. Thereafter, xylene was removed in vacuo. The obtained product is a transparent brown colored solid which can be easily crushed. This obtained curing agent is designated as G.

Curing Agent Preparation 8

In a four necked flask equipped with a thermometer, a reflux condenser, a stirrer, a nitrogen inlet device and a dropping funnel, were charged 39.1 g (0.23 mole) of isophoronediamine and 93.1 g of xylene. While blowing nitrogen into them, they were heated to 120° C. While maintaining the temperature and vigorously mixing them, was added dropwise from the dropping funnel 54.0 g (0.4 equivalent) of GOT. After addition was complete, they were kept standing at 120° C. for two hours to complete the reaction. Then, was added 40.8 g (0.4 mole) of dimethylaminopropylamine and they were heated to 130° C. While maintaining this temperature and vigorously stirring them, was added dropwise from the dropping funnel a mixture of 51.1 g (0.23 mole) of isophorone diisocyanate and 25.5 g of xylene. After addition was complete, reaction was carried out while refluxing xylene until free isocyanate is confirmed to be absent. Thereafter, xylene was removed in vacuo. The obtained product is a transparent pale yellow solid which can be readily crushed. This obtained curing agent is designated as H.

Curing Agent Preparation 9

In a four necked flask equipped with a thermometer, a reflux condenser, a stirrer, a nitrogen inlet device and a dropping funnel, were charged 33.2 g (0.195 mole) of isophoronediamine, 8.4 g (0.085 mole) of cyclohexylamine, and 97.8 g of xylene. While blowing nitrogen into them, they were heated to 120° C. While maintaining the temperature and mixing them, was added dropwise from the dropping funnel 64.6 g (0.34 equivalent) of ARALDITE GY-260 (bisphenol A type epoxide, Japan Ciba Geigy, Epoxy equivalent weight of about 190). After addition was complete, they were kept standing at 120° C. for two hours to complete the reaction. Then, was added 26.0 g (0.255 mole) of dimethylaminopropylamine and they were heated to 130° C. While maintaining this temperature and vigorously stirring them, was added dropwise from the dropping funnel a mixture of 43.4 g (0.195 mole) of isophorone diisocyanate and 21.7 g of xylene. After addition was complete, reaction was carried out while refluxing xylene until free isocyanate is confirmed to be absent. Thereafter, xylene was removed in vacuo. The obtained product is a transparent pale yellow solid which can be readily crushed. This obtained curing agent is designated as I.

Curing Agent Preparation 10

In a four necked flask equipped with a thermometer, a reflux condenser, a stirrer, a nitrogen inlet device and a dropping funnel, were charged 35.2 g (0.207 mole) of isophoronediamine, 8.9 g (0.09 mole) of cyclohexylamine, and 97.5 g of xylene. While blowing nitrogen into them, they were heated to 120° C. While maintaining the temperature and mixing them, was added dropwise from the dropping funnel 63.0 g (0.36 equivalent) of EPICRON 830 (bisphenol F type epoxide, Dainippon Ink Chemical Industries K.K., epoxy equivalent weight about 175). After addition was complete, they were kept standing at 120° C. for two hours to complete the reaction. Then, was added 27.5 g (0.27 mole) of dimethylaminopropylamine and they were heated to 130° C. While maintaining this temperature and vigorously stirring them, was added dropwise from the dropping funnel a mixture of 46.0 g (0.207 mole) of isophorone diisocyanate and 23.0 g of xylene. After addition was complete, reaction was carried out while refluxing xylene until free isocyanate is confirmed to be absent. Thereafter, xylene was removed in vacuo. The obtained product is a transparent yellow solid which can be readily crushed. This obtained curing agent is designated as J.

Curing Agent Preparation 11

In a four necked flask equipped with a thermometer, a reflux condenser, a stirrer, a nitrogen inlet device and a dropping funnel, were charged 47.5 g (0.279 mole) of isophoronediamine, 16.7 g (0.169 mole) of cyclohexylamine, and 100.8 g of xylene. While blowing nitrogen into them, they were heated to 120° C. While maintaining the temperature and mixing them, was added dropwise from the dropping funnel 70.2 g (0.52 equivalent) of GOT. After addition was complete, they were kept standing at 120° C. for two hours to complete the reaction. Then, was added 9.3 g (0.091 mole) of dimethylaminopropylamine and they were heated to 130° C. While maintaining this temperature and vigorously stirring them, was added dropwise from the dropping funnel a mixture of 33.2 g (0.15 mole) of isophorone diisocyanate and 16.6 g of xylene. After addition was complete, reaction was carried out while refluxing xylene until free isocyanate is confirmed to be absent. Thereafter, xylene was removed in vacuo. The obtained product is a transparent yellow-orange colored solid which can be readily crushed. This obtained curing agent is designated as K.

Curing Agent Preparation 12

In a four necked flask equipped with a thermometer, a reflux condenser, a stirrer, a nitrogen inlet device and a dropping funnel, were charged 32.1 g (0.3 mole) of benzylamine and 72.6 g of xylene. While blowing nitrogen into them, they were heated to 120° C. While maintaining the temperature and mixing them, was added dropwise from the dropping funnel 40.5 g (0.3 equivalent) of GOT. After addition was complete, they were kept standing at 120° C. for two hours to complete the reaction. Then, was added 30.6 g (0.3 mole) of dimethylaminopropylamine and they were heated to 130° C. While maintaining this temperature and vigorously stirring them, was added dropwise from the dropping funnel a mixture of 83.2 g (0.375 mole) of isophorone diisocyanate and 41.6 g of xylene. After addition was complete, reaction was carried out while refluxing xylene until free isocyanate is confirmed to be absent. Thereafter, xylene was removed in vacuo. The obtained product is a transparent yellow solid which can be readily crushed. This obtained curing agent is designated as L.

EXAMPLES 1 TO 23

Curing agents A to L obtained in Curing Agent Preparations 1 to 12, respectively, were each finely divided and added to and dispersed in ARALDITE GY-260 together with AEROSIL 300 (a product of Nippon Aerosil K.K.; a particulate silica), and these compositions were tested for curing property and storage stability.

Evaluation of curing property

A sample of about 0.1 to 0.2 g was placed on a hot plate which was set to predetermined temperature, and the time until gelation of the sample was determined.

Evaluation of storage stability:

A sample was placed in a thermostatic chamber at 45° C. and days until fluidity loss of the sample were recorded.

The test results for these properties are shown in the table.

TABLE 1

| | BLENDING RATIOS AND RESULTS OF EXAMPLES 1 TO 23 | | | | | | |
|---|---|---|---|---|---|---|---|
| | Epoxide composition | | | | Curing time (min) | | Storage stability |
| | curing agent | | AE. 300 | epoxide | | | |
| Ex. | symbol | (parts) | (parts) | (parts) | 120° C. | 100° C. | 80° C. | (days) |
| 1 | A | 20 | 1 | 100 | 6.4 | 60< | 60< | 30< |
| 2 | A | 30 | 1 | 100 | 4.2 | 26.5 | 60< | 30< |
| 3 | B | 10 | 1 | 100 | 3.2 | 12.5 | 60< | 30< |
| 4 | B | 20 | 1 | 100 | 2.2 | 11.2 | 60< | 20 |
| 5 | C | 10 | 1 | 100 | 6.8 | 60< | 60< | 30< |
| 6 | C | 20 | 1 | 100 | 4.2 | 27.4 | 60< | 30< |
| 7 | D | 10 | 1 | 100 | 3.4 | 12.8 | 60< | 30< |
| 8 | D | 20 | 1 | 100 | 2.5 | 11.6 | 60< | 30< |
| 9 | E | 10 | 1 | 100 | 3.0 | 5.7 | 15.0 | 30< |
| 10 | E | 20 | 1 | 100 | 1.5 | 3.3 | 8.4 | 16 |

TABLE 1-continued

| | BLENDING RATIOS AND RESULTS OF EXAMPLES 1 TO 23 | | | | | | Storage |
|---|---|---|---|---|---|---|---|
| | Epoxide composition | | | | | | |
| | curing agent | AE. 300 | epoxide | Curing time (min) | | | stability |
| Ex. | symbol (parts) | (parts) | (parts) | 120° C. | 100° C. | 80° C. | (days) |
| 11 | F 10 | 1 | 100 | 3.8 | 14.9 | 60< | 30< |
| 12 | F 20 | 1 | 100 | 1.8 | 4.6 | 20.9 | 22 |
| 13 | G 10 | 1 | 100 | 3.1 | 6.1 | 21.0 | 30< |
| 14 | G 20 | 1 | 100 | 1.8 | 4.0 | 12.0 | 4 |
| 15 | H 10 | 1 | 100 | 2.5 | 6.5 | 25.9 | 30< |
| 16 | H 20 | 1 | 100 | 1.5 | 3.5 | 14.0 | 18 |
| 17 | I 10 | 1 | 100 | 2.9 | 13.3 | 60< | 30< |
| 18 | I 20 | 1 | 100 | 1.7 | 5.2 | 33.2 | 30< |
| 19 | J 10 | 1 | 100 | 2.9 | 12.8 | 60< | 30< |
| 20 | J 20 | 1 | 100 | 1.6 | 5.5 | 37.6 | 30< |
| 21 | K 20 | 1 | 100 | 4.0 | 8.4 | 30.8 | 30< |
| 22 | L 10 | 1 | 100 | 4.2 | 7.9 | 37.8 | 30< |
| 23 | L 20 | 1 | 100 | 2.3 | 4.2 | 16.7 | 30< |

Ex. = Examples
AE. 300 = AEROSIL 300

It is apparent from above that the present invention provides an epoxide composition which utilizes a curing agent free from volatile by-product generation during its synthesis, has excellent storage stability, and can be cured rapidly at a relatively low temperature region when heated.

We claim:

1. A one-pack epoxide composition which can be heat cured at 80° C. or higher and which comprises
   (A) at least one epoxide having more than one epoxy group in the molecule, and
   (B) a curing agent which is the reaction product of
      (a) at least one N,N-dialkylaminoalkylamine represented by the general formula

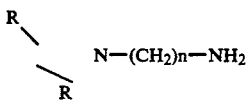

wherein R is an alkyl group of 1 to 4 carbon atoms, and n is 2 to 3,
      (b) at least one amine having one or two nitrogen atoms with active hydrogen and having a ring structure in its molecule, and
      (c) at least one diisocyanate,
   and which is prepared by heating said reactants (B)(a), (B)(b) and (B)(c) at a temperature of from room temperature to 160° C. in a molar ratio of (B)(b) to (B)(a) of $0.02 \text{ mole} \leq (B)(b) \leq 3.0$ mole and in a chemical equivalent of diisocyanate in (B)(c) per one nitrogen with active hydrogen of (B)(a) and (B)(b) of 1 chemical equivalent $\leq$ diisocyanate $\leq 1.2$ chemical equivalents.

2. A composition according to claim 1 wherein at least one epoxide of (A) is selected from polyglycidyl ethers, polyglycidyl ether esters, polyglycidyl esters, glycidylaminoglycidyl ethers, glycidylaminoglycidyl ester, polyglycidylamines and mono-epoxides and mixtures of these epoxides.

3. A composition according to claim 1 wherein at least one N, N-dialkylaminoalkylamine of (B)(a) is dimethylaminopropylamine or diethylaminopropylamine.

4. A composition according to claim 1 wherein one or more amine of (B)(b) is selected from methaxylylenediamine, 1,3-bis(aminomethyl)cyclohexane, isophoronediamine, N-aminoethylpiperadine, cyclohexylamine and benzylamine.

5. A composition according to claim 1 wherein one or more diisocyanate (B)(c) has a ring structure.

6. A one-pack epoxide composition which can be heat cured at 80° C. or higher and which comprises
   (A) at least one epoxide having more than one epoxy group in the molecule, and
   (C) a curing agent which is the reaction product of
      (a) at least one N,N-dialkylaminoalkylamine represented by the general formula

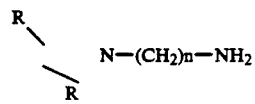

wherein R is an alkyl group of 1 to 4 carbon atoms, and n is 2 or 3,
      (b) at least one amine having one or two nitrogen atoms with active hydrogen and having a ring structure in its molecule, and
      (c) at least one diisocyanate, and
      (d) at least one epoxide having more than one epoxy group in the molecule,
   and which prepares by heating at least part of said reactant (C)(b), and reactant (C)(d) at 60° C. to 120° C. and, then adding reactant (C)(a), the rest of reactant (C)(b), and reactant (C)(c), and heating them at a temperature of from room temperature to 160° C.,
   the molar ratio of (C)(b) to (C)(a) being 0.5 mole $\leq (C)(b) \leq 5.0$ mole, and the chemical equivalent of diisocyanate in (C)(c) per one nitrogen atom with active hydrogen in (C)(a) and (C)(b) being 0.15 chemical equivalent $\leq$ diisocyanate $\leq 1.35$ chemical equivalents, the chemical equivalent of epoxide in (C)(d) per one nitrogen atom with active hydrogen of (C)(a) and (C)(b) being 3.0 chemical equivalent $\leq$ epoxide $\leq 0.9$ chemical equivalent, and the sum of chemical equivalent of diisocyanate in (C)(c) and the chemical equivalent of epoxide in (C)(d) per one nitrogen atom with active hydrogen in (C)(a) and (C)(b) being 1.0 chemical equivalent $\leq$ sum of chemical equivalent of diisocyanate and epoxide $\leq 1.8$ chemical equivalents.

7. A composition according to claim 6 wherein at least one epoxide of (A) or of (C)(d) is selected from polyglycidyl ethers, polyglycidyl ether esters, polyglycidyl esters, glycidylaminoglycidyl ethers, glycidylaminoglycidyl ester, polyglycidylamines and mono-epoxides and mixtures of these epoxides.

8. A composition according to claim 6 wherein at least one N,N-dialkylaminoalkylamine of (C)(a) id dimethylaminopropylamine or diethylaminoproylamine.

9. A composition according to claim 6 wherein at least one amine of (C)(b) is selected from methaxylylenediamine, 1,3-bis(aminomethyl)cyclohexane, isophoronediamine, N-aminoethylpiperadine, cyclohexylamine and benzylamine.

10. A composition according to claim 6 wherein at least one diisocyanate of (C)(c) has a ring structure.

* * * * *